Oct. 1, 1968  R. J. TRNKA  3,403,446
SCORE THICKNESS GAUGE
Filed Oct. 17, 1966  3 Sheets-Sheet 1
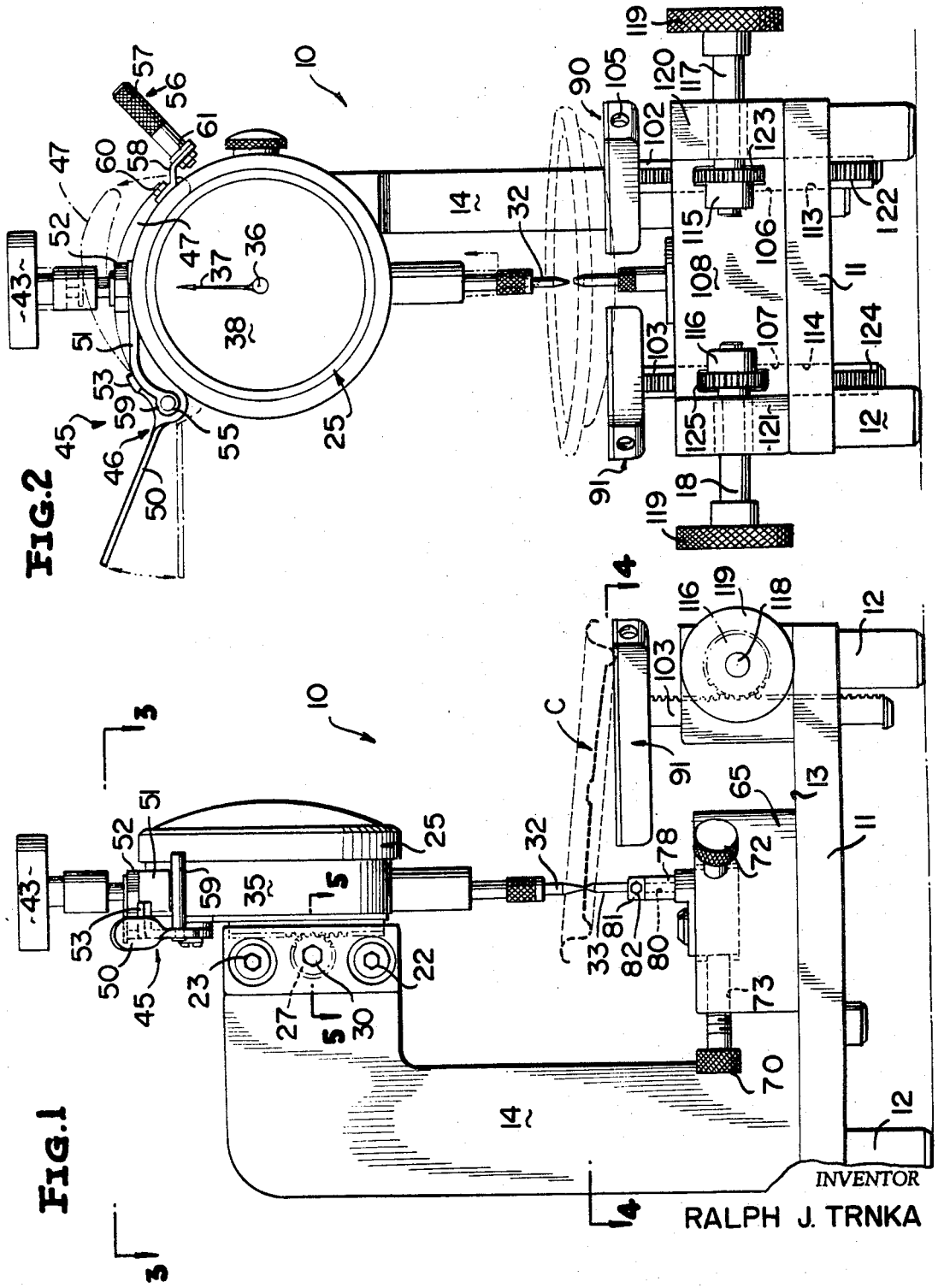
INVENTOR
RALPH J. TRNKA
BY Mason, Porter, Diller & Brown
ATTORNEYS Oct. 1, 1968  R. J. TRNKA  3,403,446

SCORE THICKNESS GAUGE

Filed Oct. 17, 1966  3 Sheets-Sheet 2

INVENTOR
RALPH J. TRNKA

BY *Mason, Porter, Diller & Brown*
ATTORNEYS

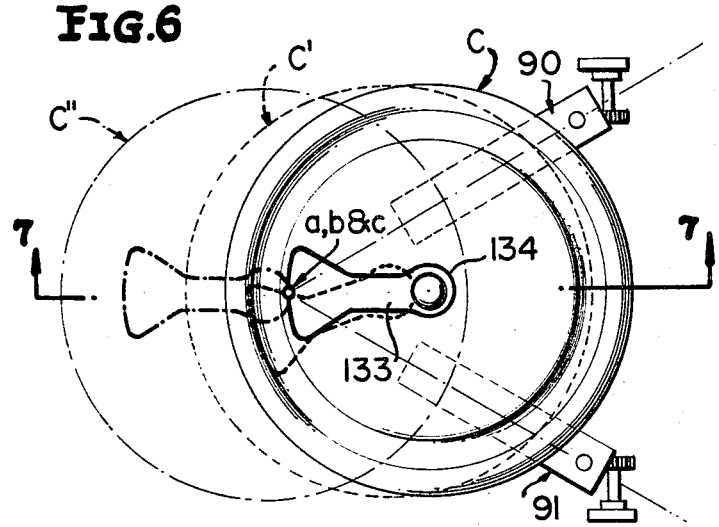
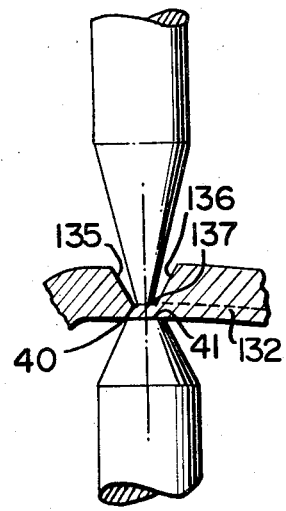
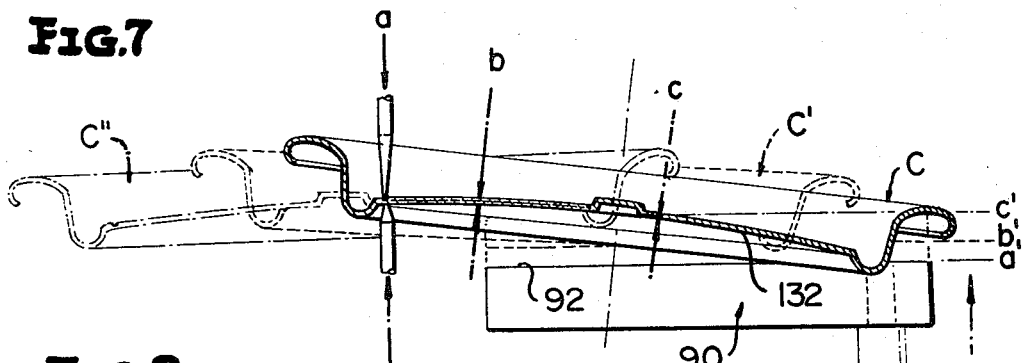
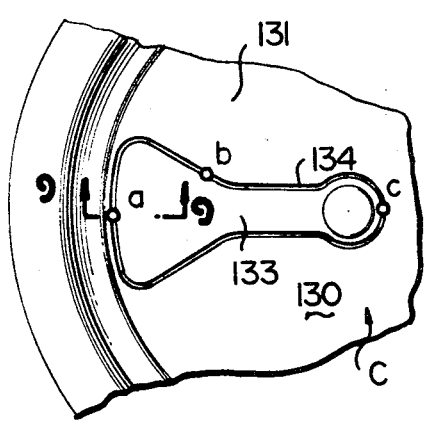
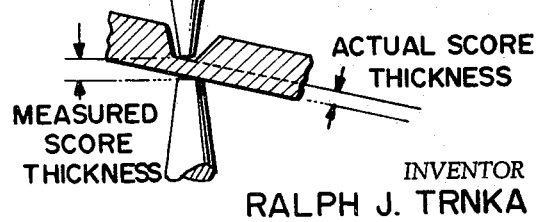

United States Patent Office 3,403,446
Patented Oct. 1, 1968

3,403,446
SCORE THICKNESS GAUGE
Ralph J. Trnka, Riverdale, Ill., assignor to Continental Can Company, Inc., New York, N.Y., a corporation of New York
Filed Oct. 17, 1966, Ser. No. 587,055
18 Claims. (Cl. 33—147)

ABSTRACT OF THE DISCLOSURE

This disclosure relates to a gauge for measuring the thickness of a can end score line and includes an anvil above which is supported a gauge element having means for entering a can end score line, a plurality of supports adjacent the anvil, the supports and the anvil being in triangularly disposed relative relationship, and means for moving the supports individually whereby a can end being engaged can be selectively disposed in a plane generally normal to the axis of the anvil and gauge element means to ensure an accurate measurement of the score line thickness.

---

It is conventional in the can making industry to form container end closures from metallic material having portions of end panels thereof adapted to be removed to gain access to packaged products. The removable portion of the end panel is generally defined by a score or score line which reduces the thickness of the end panel and facilitates the removal of the portion of the end panel defined by the score. The thickness of the material at the score may vary depending upon numerous factors such as, for example, the particular material from which the end closure is constructed, the particular product which is to be packaged in the container, etc. However, in all cases the thickness of the material at the score line, hereinafter referred to as score line thickness, must be within a range which will assure ease of opening by a consumer yet will not inadvertently or accidentally rupture during handling or storage. From a manufacturing standpoint it is therefore extremely desirable to be able to consistently and accurately gauge the score line thickness of end closures.

Heretofore conventional thickness gauges have been employed to measure the score line thickness of end closures but such conventional gauges have been found to be incapable of accurately and consistently measuring score line thickness. A major reason for the shortcomings of conventional gauges is the impossibility of accurately positioning the portion of an end closure which is to be gauged between axially aligned gauge elements. That is, due to the varied axial cross-sectional configuration of end closures it has been found virtually impossible to position the bottom surface of the score and the bottom surface of the end panel along any portion of the score in parallel contacting relationship with faces of the gauge elements. As can be readily appreciated, if the faces of the gauge elements cannot be positioned in perfectly flat contacting relationship with the bottom surface of the score and the lower surface of the closure end an inaccurate measurement indicating a greater score thickness will result.

In keeping with the above it is a primary object of this invention to provide a novel gauge which overcomes the above and numerous other disadvantages in thickness measuring devices by providing individually adjustable supports upon which an end closure is partially supported and providing means for individually adjusting the supports whereby the angular relationship of the end closure can be varied to bring the bottom surface of the score and the bottom surface of the closure at any point of gauging along the score into normal relationship with a pair of gauging elements whereby an accurate indication of score thickness is at all times assured.

A further object of this invention is to provide a novel gauge of the type including a base, an anvil in upstanding relationship relative to the base being adapted to contactingly engage a lower surface of an end closure, a gauge element above the base in substantial axial alignment with the anvil, the gauge element being adapted to contactingly engage the lower surface of the end closure score, a plurality of supports for additionally supporting the end closure, and means mounting the supports for individual movement either upwardly or downwardly in a generally vertical plane to position the portion of the score to the gauge in a plane generally normal to the axes of the anvil and the gauge element.

Still another object of this invention is to provide a novel gauge of the type immediately above described including means for moving the supports in a plane generally normal to the axes of the anvil and the gauge element whereby the gauge is adapted to accommodate container end closures of varying diameters and configurations.

Yet another object of this invention is to provide a novel gauge of the type heretofore described wherein means are provided for mounting the supports relative to the base, the support mounting means including a generally vertically disposed post associated with each support, each post including a toothed portion, a gear in meshing engagement with each toothed portion, and means associated with each gear for manually rotating the gears individually both clockwise or counterclockwise whereby the supports can be individually raised or lowered relative to the base.

A further object of this invention is to provide a novel gauge of the type heretofore described wherein means are provided for adjusting the anvil in a plane normal to the gauge element axis whereby the axes of the gauge element and the anvil are at all times exactly aligned.

With the above and other objects in view that will hereinafter appear, the nature of the invention will be more clearly understood by reference to the following detailed description, the appended claims and the several views illustrated in the accompanying drawings.

In the drawings:

FIGURE 1 is a side elevational view of a novel gauge constructed in accordance with this invention, and illustrates an end closure supported at three points by a pair of vertically adjustable supports and an anvil.

FIG. 2 is a front elevational view of the gauge of FIGURE 1, and illustrates manually operable means for individually moving the supports either upwardly or downwardly in a generally vertical plane.

FIGURE 6 is a highly schematic top plan view of the anvil and the supports of FIGURES 1 through 4, and illustrates three different positions of a closure during the measurement of three different portions of a score in an end panel of the closure.

FIGURE 7 is an enlarged sectional view taken generally along line 7—7 of FIGURE 6, and illustrates three different positions of the supports during the three different measurements of the closure of FIGURE 6.

FIGURE 8 is a highly enlarged fragmentary top plan view of the closure of FIGURES 6 and 7, and basically depicts three portions of the score which may be desirably gauged for thickness by the gauge in accordance with this invention.

FIGURE 9 is a highly enlarged fragmentary sectional view taken generally along line 9—9 of FIGURE 8 and illustrates gauging surfaces of the gauge element and anvil in perfectly flush contactingly relationship with a lower surface of the closure and a lower surface of the score.

FIGURE 10 is a highly enlarged fragmentary sectional view similar to FIGURE 9, and illustrates the gauging surfaces of the gauge element in accurately contacting the score.

Figure 5:
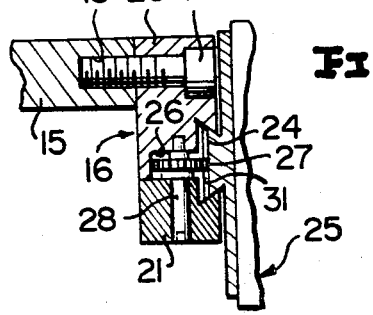
FIGURE 5 is an enlarged fragmentary sectional view taken generally along line 5—5 of FIGURE 1, and illustrates a mechanism for adjusting the gauge element in a vertical plane.

Referring now to FIGURE 1 of the drawings, the gauge is generally referred to by the reference numeral 10 and includes a base 11 which has a plurality of feet, each being designated by the reference numeral 12. The base 11 includes an upper surface 13 to which is secured an upstanding arm 14. An end portion 15 (FIGURE 5) of the arm 14 fixedly carries a block 16. The block 16 is attached to the portion 15 of the arm 14 by means of a plurality of bolts 17 (only one of which is illustrated) threadably received in threaded bores 18. The block 16 includes two portions 20, 21 which are secured to one another by bolts 22, 23 (FIGURE 1). The portions 20, 21 of the block 16 are cut out to define a vertically extending dovetail slot 24. The slot 24 opens in one direction toward a gauge head 25 (FIGURE 5) and merges in an opposite direction with a recess 26. The recess 26 is positioned substantially midway between the bolts 22, 23 as is apparent from FIGURE 1 of the drawings. A gear 27 is journalled for rotation in the recess 26 by means of a shaft 28 which has a polygonal shaped opening 30 for receiving a complementary contoured tool for rotating the gear either clockwise or counterclockwise. The gear 27 is in mesh with a toothed rack 31 of the gauge head 25. The toothed rack 31 is of a dovetail configuration and is housed within the dovetail slot 24. With the bolts 22, 23 loosened the gear 27 can be rotated by means of a tool inserted in the opening 30 to move the gauge head 25 upwardly or downwardly to preposition a gauge element 32 (FIGURE 1) of the gauge head 25 relative to an anvil 33. Once the gauge element 32 of the gauge head 25 is prepositioned the bolts 22, 23 are tightened and the portions 20, 21 of the block 16 clampingly engage the side (unnumbered) of the toothed rack 31 to prevent the gauge head 25 from moving relative to the arms 14 or the base 11.

The gauge head 25 is of a generally conventional construction and includes a casing 35 in which is housed any type of conventional mechanisms which accurately convert the linear movement of the gauge element 32 into rotational movement of a dial shaft 36 (FIGURE 2) carrying an indicating arm 37. A face 38 (FIGURE 2) of the gauge head 25 is calibrated in ten-thousandths of an inch (not shown) and the indicating dial 37 is movable clockwise to indicate the spacing in ten-thousandths of an inch between gauge faces 40, 41 (FIGURE 9) of the respective elements 32 and 33 during a gauging operation, as will be more apparent hereafter.

An opposite end portion 42 of the vertically reciprocal gauge element 32 projects upwardly outwardy of the housing 35 and carries a weight 43 (FIGURE 1). The weight applies a constant output load or pressure (1 ounce) against an article such as a container closure C during a gauging operation.

Figure 3:
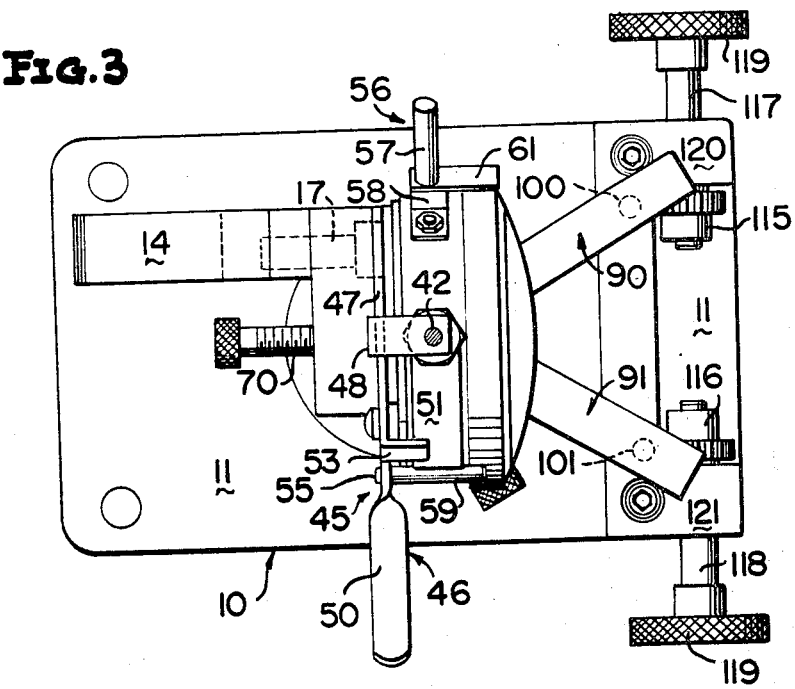
FIGURE 3 is a sectional view taken generally along line 3—3 of FIGURE 1, and illustrates a mechanism for raising and lowering a gauge element which is in axial alignment with the anvil.

In addition to adjusting the vertical position of the gauge element 32 by means of the gear 27 and the rack 31, the gauge element 32 can be raised upwardly to separate the gauge element 32 and the anvil 33 by means of a gauge element raising mechanism, generally referred to by the reference numeral 45. The gauge element raising mechanism 45 includes an arm 46 having a curved end portion 47 which normally underlies a bracket 48 fixed to the end portion 42 of the gauge element 32 (FIGURES 1 and 3). An opposite end portion 50 of the arm 46 is adapted to be depressed downwardly from the solid to the phantom outline positions in FIGURE 2 to raise the opposite end portion 47 from the solid to the phantom outline position in this same figure to progressively urge the bracket 48 upwardly and along therewith the gauge element 32. The arm 46 is pivotally secured to a bracket 51 which is in turn secured to the casing 35 of the gauge head 25. The bracket 51 is provided with an aperture (not shown) through which passes the end portion 42 of the gauge element 32. Suitable means, such as an externally threaded sleeve (not shown) and a bolt 52 are provided for securing the bracket 51 to the casing 35. In lieu of the sleeve and nut 52, the bracket 51 can merely be welded or otherwise fixedly attached to the exterior of the casing 35. A pivot pin 55 fixedly secured to the arm 46 projects outwardly therefrom and is pivotally journalled in a tubular portion 59 of the bracket 51. Clockwise pivoting of the arm 46 from the phantom to the solid line positions thereof (FIGURE 2) is limited when a tab 53 of the arm 46 contacts the bracket 51, as is illustrated in solid lines in FIGURE 2.

A mechanism 56 is provided for maintaining the mechanism 45 in the uppermost position thereof. The mechanism 56 includes a manually grippable handle 57 which is secured by a threaded stem and nut (both unnumbered) to a bracket 58 which is in turn pivotally secured to the casing 35 by a nut and bolt, generally designated by the reference numeral 60. A tab 61 (FIGURES 2 and 3) is sandwiched between the bracket 58 and the handle 57. In the normal out-of-the-way position of the mechanism 56, the tab 61 projects in the same direction as the indicator shaft 36, i.e., left-to-right, as viewed in FIGURE 3 of the drawings. If it is desired to maintain the gauge element 32 raised for any extended period of time, the handle 57 is grasped and the arm 58 is rotated 180 degrees until the tab 61 underlies the portion 47 of the arm 46. The portion 47 of the arm 46 thereby rests upon the tab 61 and the gauge element raising mechanism is precluded from lowering the gauge element 32 until the end portion 50 of the arm 46 is depressed slightly and the arm 58 is again rotated 180 degrees to the position illustrated in FIGURES 2 and 3 of the drawings.

The anvil 33 of the gauge 10 is supported in axial alignment with the gauge element 32 by support means, generally referred to by the numeral 65. The support means 65 include a generally cylindrical support member 66 having an upwardly opening circular recess or chamber 67. The support member 66 is fixed to the upper surface 13 of the base 11 by conventional bolts 68. Three headed threaded bolts 70, 71 and 72 are adjustably threadably received in threaded bores 73, 74 and 75, respectively, of the support member 66. End portions (unnumbered) of the bolts 73 through 75 project into the chamber 67 and normally contact an exterior peripheral surface 76 of a cylindrical body 77 carrying the anvil 33. As is readily apparent from FIGURES 1 and 4 of the drawings, the screws 70 through 72 can be selectively threaded into or out of the respective threaded bores 73 through 75 to adjust the position of the body 77 and thereby adjust the position of the anvil 33 relative to the gauge element 32. Due to this construction, the axes of the elements 32, 33 can be maintained at all times in perfect alignment.

The body 77 includes an upstanding neck 78 having a vertical passage or bore 80. The lower end portion (unnumbered) of the anvil 33 is slidably received in the bore 80 (FIGURE 1). A collar 81 surrounds the anvil 33 and is adjustably fixed thereto by a set screw 82 which is threadably received in a threaded bore (unnumbered) of the collar 81. By adjusting the collar 81 relative to the anvil 33, the latter can be preadjusted to any particular height. For example, if it is desired to lower the anvil 33 from the position illustrated in FIGURE 1 of the drawings, the set screw 82 is loosened, the gauge element 33 is lowered the desired amount into the bore 80 and the set screw 82 is then tightened to prevent sliding movement between the gauge element 33 and the collar 81. The neck 78 supports the collar 81 in this new position of adjustment and thereby indirectly supports the anvil 33.

A pair of supports 90, 91 (FIGURES 2 through 4 of the drawings) are supported to one side of the gauge element 32 and the anvil 33. The supports 90, 91 have upper surfaces 92, 93 and end portions 94, 95 respectively. Each end portion 94, 95 of the supports 90, 91 is provided with a vertical bore 96, 97, respectively. A reduced end portion 100, 101 of a pair of posts 102, 103 (FIGURE 2) is received in the respective openings or bores 100, 101 of the supports 90, 91. A set screw 104 (FIGURE 4) is threaded into a threaded bore 105 in the end portions 94, 95 of each of the supports 90, 91. The set screws 104 bottom against the reduced end portions 100, 101 to fixedly secure the supports 90, 91 in any desired position of adjustment depending upon the particular size and configuration of the closure which is to be gauged.

Figure 4:
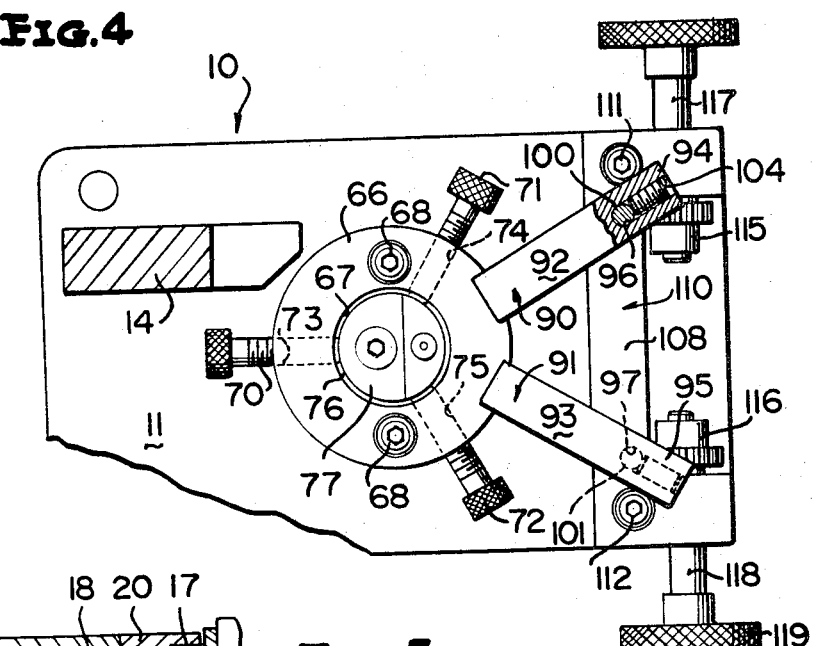
FIGURE 4 is a fragmentary sectional view taken generally along line 4—4 of FIGURE 1, and illustrates means for adjusting the anvil in a plane normal to the axis of the anvil and the gauge element, and means supporting the supports for swinging movement in a generally horizontal plane.

The posts 102, 103 are vertically movable in vertical openings 106, 107 (FIGURE 2) in a bight portion 108 of a generally U-shaped bracket 110 fixed to the base 11 by conventional bolts 111, 112 (FIGURE 4). The openings 106, 107 are in alignment with respective openings 113, 114 of the base 11 (FIGURE 2).

Gears 115, 116 are fixed to respective shafts 117, 118 which are respectively journalled for rotation in arms 120, 121 of the bracket 110. The shafts 117, 118 include knurled knobs or handles 119 for rotating the gears in a clockwise or a counterclockwise direction. The gear 115 is in mesh with a toothed rack 122 of the post 102 through a recess 123 of the bight portion 108 of the bracket 110. The gear 116 is similarly in mesh with a toothed rack 124 of the post 103 through a slot 125 in the bight portion 108.

Referring to FIGURES 6 through 8 of the drawings, the container end closure C is typical of end closures which are particularly adapted to be gauged by the gauge 10 of this invention, and includes an end panel 130 having an upper surface 131 and a lower surface 132. The end panel 130 is bowed convexly outwardly, as is best illustrated in FIGURE 7 of the drawings, and includes a tear out or removable portion 133 defined by a continuous score or score line 134. The score 134 is defined by upwardly diverging surfaces 135, 136 (FIGURE 9) and a lower or bottom surface 137. The "score thickness" is the thickness of material between the surface 137 of the score 134 and the lower surface 132 of the end panel 130.

Prior to performing a gauging operation of the container end closure C, the gauge is first checked and, if necessary, any adjustment to the various components which may be necessary are performed. For example, the axes of the gauge element 32 and the anvil 33 must be in perfect axial alignment and if misaligned, the anvil 33 is adjusted by manipulating the screws 70 through 72 to bring the anvil 33 and the gauge element 32 in perfect axial alignment.

The height of the anvil 33 may also be adjusted in the manner heretofore described by means of the set screw 82 and the collar 81. The anvil 33 is preferably set at a height at which the face 41 thereof is at all times during a gauging operation above the surfaces 92, 93 of the supports 90, 91, respectively, and specifically one-eighth inch below the maximum height of the supports 90, 91.

The gauge head 25 is also adjusted in a vertical direction by means of the gear 27 and the toothed rack 31 in the manner heretofore described. The entire gauge head 25 may be, for example, lowered until the faces 40, 41 of the gauge element 32 and the anvil 33 are in light contact after which the bolts 22, 23 are tightened. At this point the indicating dial 37 is at zero and any movement of the gauge element 32 will rotate the shaft 36 and the indicating dial 37 to indicate the distance between the faces 40, 41 of the respective elements 32, 33.

The supports 90, 91 may also be swung in a horizontal plane to a less converging relationship than that illustrated in FIGURE 4 of the drawings, or to a parallel relationship, or to a diverging relationship depending upon the diameter of the end closure being measured. In the case of the end closure C which is of a relatively small diameter the supports 90, 91 are positioned in converging relationship, as illustrated in the drawings.

Assuming that a point a (FIGURE 8) of the score 134 is to be gauged for thickness, the end portion 50 of the gauge element raising mechanism 45 is depressed to raise the gauge element 32 a sufficient distance to position the closure C between the gauge element 32 and the anvil 33. The anvil 33 is located directly beneath the point a and supports the closure C at this point. The closure C is also supported by the supporting surfaces 92, 93 of the supports 90, 91, as is best illustrated in FIGURES 6 and 7 of the drawings. The gauge element raising mechanism 45 is then released slowly and the face 40 of the gauge element 32 contacts the surface 137 of the score 134 at the point a. If the surfaces 137, 132 are not perfectly parallel to the faces 40, 41 and normal to the axes of the anvil 33 and the gauge element 32, as illustrated in FIGURE 10 of the drawings, the distance between the faces 40, 41 is not a correct indication of the score thickness. In most cases the surfaces 137, 132 are never perfectly normal to the axes of the anvil 33 and the gauge 32 and the supports 90, 91 must then be adjusted until a minimum reading is indicated by the indicating arm 37. This is done by rotating the knobs 119 simultaneously in one direction and then simultaneously in an opposite direction to simultaneously raise and then lower the supports 90, 91. During the simultaneous upward movement of the supports 90, 91 or downward movement thereof, a minimum thickness will be indicated by the indicating dial 37 when the surfaces 137, 132 are in complete contact with the faces 40, 41 of the gauge element 32 and the anvil 33, respectively. This perfect contact between the surfaces 137, 132 and the faces 40, 41 is diagrammatically illustrated in FIGURES 7 and 9 of the drawings at a point at which the surfaces 92, 93 are at a height a' (FIGURE 7).

It is possible, however, that at this point during the gauge operation the faces 40, 41 are not in fact in complete flat contact with the respective surfaces 137, 132. The knobs 119 are therefore simultaneously rotated in opposite directions causing one support to raise while the other is lowered and vice versa until another minimum reading is indicated by the indicating dial 37. If perfect contact between the surfaces 137, 132 and the faces 40, 41 was made during a first phase of the gauging operation at which time the supports 90, 91 were moved in an identical direction the second reading obtained during the opposite movement of the supports would at all times be greater than the first reading and the first minimum reading is therefore the correct indication of the score thickness. However, if the faces 40, 41 were not flush with the surfaces 137, 132 during the first reading the movement of the supports in opposite directions during the second phase of the gauging operation would indicate a lesser reading than the first reading, thereby indicating that the second minimum reading is the correct score thickness. In this manner two readings are obtained during each gauging operation and the minimum reading is indicative of the score thickness of the score at the particular point being gauged.

In order to gauge another point along the score 134, as for example the point b, the gauge element raising mechanism 45 is actuated to raise the gauge element 32 after which the end closure C is shifted until the point b overlies the anvil 33, as is indicated by the phantom outline position C' in FIGURES 6 and 7 of the drawings. Since the bottom surface 137 of the score at point b is higher than the bottom surface 137 of the score at point a, it is necessary to raise the supports 90, 91 to place the surfaces 137, 132 at point b in parallel relationship to the gauge faces 40, 41 and normal to the axes of the anvil 33 and the gauge element 32. The plane b' of FIGURE 8 graphically illustrates a height at which the surfaces and faces of the elements 32, 33 are in perfect parallel relationship and a minimum reading is obtained by the procedure heretofore described.

A last point c of the closure and any other remaining points can be similarly gauged. Here again, since the bottom surface 137 of the score at point c is disposed above the surface at points a and b the supports 90, 91 must be again raised to a level c' when the closure is in the phantom outline poistion c" of FIGURES 6 and 7.

From the foregoing, it will be seen that novel and advantageous provisions have been made for carrying out the desired end. However, attention is again directed to the fact that additional variations may be made in this invention without departing from the spirit and scope thereof as defined in the appended claims.

I claim:

1. A gauge particularly adapted for measuring the thickness of an article comprising a base, means supporting an anvil in upstanding relationship relative to said base, said anvil being adapted to contactingly engage a lower surface of an article to be gauged, means supporting a gauge element above said base in substantial axial alignment with said anvil, said gauge element being adapted to contactingly engage an upper surface of an article to be gauged whereby the distance between said anvil and gauge element represents the thickness of the portion of the article between the upper and lower surfaces thereof, a plurality of supports, means for mounting said plurality of supports for movement toward and away from said base whereby the upper and lower surfaces of an article being gauged can be selectively disposed in a plane generally normal to the axes of the anvil and gauge element to ensure an accurate measurement of the article, said mounting means being effective for mounting said plurality of supports for individual movement relative to said base, said anvil supporting means including means for adjusting the position of said anvil in a direction normal to the gauge element axis, said adjusting means including a housing defining a chamber, said anvil being carried by a body seated in said chamber, a plurality of adjustable means projecting into said chamber through said housing into contact with spaced portions of said body, and said adjustable means being selectively movable toward and away from said body.

2. A gauge particularly adapted for measuring the thickness of an article comprising a base, means supporting an anvil in upstanding relationship relative to said base, said anvil being adapted to contactingly engage a lower surface of an article to be gauged, means supporting a gauge element above said base in substantial axial alignment with said anvil, said gauge element being adapted to contactingly engage an upper surface of an article to be gauged whereby the distance between said anvil and gauge element represents the thickness of the portion of the article between the upper and lower surfaces thereof, a plurality of supports, means for mounting said plurality of supports for movement toward and away from said base whereby the upper and lower surfaces of an article being gauged can be selectively disposed in a plane generally normal to the axes of the anvil and gauge element to ensure an accurate measurement of the article, said mounting means being effective for mounting said plurality of supports for individual movement relative to said base, said supports are elongated members having opposite end portions, and means are provided for securing an end portion of each support in swinging relationship to an associated one of said posts for swinging movement in a plane normal to the axes of the anvil and gauge elements.

3. A gauge particularly adapted for measuring the thickness of a can end score line comprising a base, means supporting an anvil in upstanding relationship relative to the base, said anvil being adapted to contactingly engage a lower surface of a can end to be gauged, means supporting a gauge element above said base in substantial axial alignment with said anvil, said gauge element having means for entering a can end score line and contacting the bottommost surface thereof whereby the distance between said anvil and gauge element means represents the thickness of the material of the score line, a plurality of supports, said supports and said anvil being in triangularly disposed relative relationship, and means for mounting said plurality of supports for individual movement toward and away from said base whereby a can being engaged can be selectively disposed in a plane generally normal to the axes of the anvil and the gauge element means with the bottommost surface of the score line in flush engagement with the gauge element means to ensure an accurate measurement of the article.

4. The gauge as defined in claim 3 wherein said anvil supporting means includes means for adjusting the position of said anvil in a direction normal to the gauge element axis, said adjusting means includes a housing defining a chamber, said anvil being carried by a body seated in said chamber, a plurality of adjustable means projecting into said chamber through said housing into contact with spaced portions of said body, and said adjustable means being selectively movable toward and away from said body.

5. The gauge as defined in claim 3 wherein means are provided for swinging said supports in a plane normal to the axes of the anvil and gauge elements.

6. The gauge as defined in claim 1 wherein said gauge element adjusting means includes an upstanding support, and rack and pinion means disposed between said support and said gauge element supporting means for imparting vertical movement to said gauge element upon rotation of said pinion.

7. The gauge as defined in claim 3 wherein said anvil supporting means includes means for adjusting the position of said anvil in a direction normal to the gauge element axis.

8. The gauge as defined in claim 3 wherein means are provided for moving said supports in a plane normal to the axes of the anvil and gauge element.

9. The gauge as defined in claim 3 wherein said anvil supporting means includes means for adjusting the position of said anvil in a direction parallel to the gauge element axis.

10. The gauge as defined in claim 3 wherein said gauge element supporting means includes means for adjusting the position of said gauge element in a direction parallel to the axis thereof.

11. The gauge as defined in claim 3 wherein said support mounting means includes a generally vertically disposed post associated with each support, each post including a toothed portion, a gear in meshing engagement with each toothed portion, and means associated with each gear for rotating said gears individually both clockwise or counterclockwise whereby said supports can be individually raised or lowered relative to said base.

12. The gauge as defined in claim 3 wherein said gauge element supporting means includes means for moving said gauge element in a direction parallel to the axis thereof, and means are provided for moving said supports in a plane normal to the axes of the anvil and gauge element.

13. The gauge as defined in claim 3 wherein said anvil supporting means includes means for adjusting the position of said anvil in a direction normal to the gauge element axis, and means are provided for moving said supports in a plane normal to the axes of the anvil and gauge element.

14. The gauge as defined in claim 3 wherein said support mounting means includes toothed rack means associated with each support, gear means in mesh with each rack means, and manually manipulatable means associated with each gear means for individually rotating each gear means in either clockwise or counterclockwise direction for moving each of said supports in either of two opposite directions individually or simultaneously.

15. The gauge as defined in claim 3 wherein said support mounting means includes a generally vertically disposed post associated with each support, first means for moving a first of the posts in either of two opposite vertical directions, and second means for moving another of the posts in either of two opposite vertical directions independent of the first post moving means.

16. The gauge as defined in claim 15 wherein means are provided for moving said supports in a plane normal to the axes of the anvil and gauge element.

17. The gauge as defined in claim 2 wherein said anvil suporting means includes means for adjusting the position of said anvil in a direction normal to the gauge element axis, said adjusting means includes a housing defining a chamber, said anvil being carried by a body seated in said chamber, a plurality of adjustable means projecting into said chamber through said housing into contact with spaced portions of said body, and said adjustable means being selectively movable toward and away from said body.

18. The gauge as defined in claim 17 wherein said anvil supporting means includes means for adjusting the position of said anvil in a direction parallel to the gauge element axis.

References Cited
UNITED STATES PATENTS

| | | | |
|---|---|---|---|
| 1,422,161 | 7/1922 | Woodrow | 33—147 |
| 2,714,765 | 8/1955 | Creek et al. | 33—147 |
| 3,325,904 | 6/1967 | Backus | 33—174 |

SAMUEL S. MATTHEWS, *Primary Examiner.*